Figure 3:
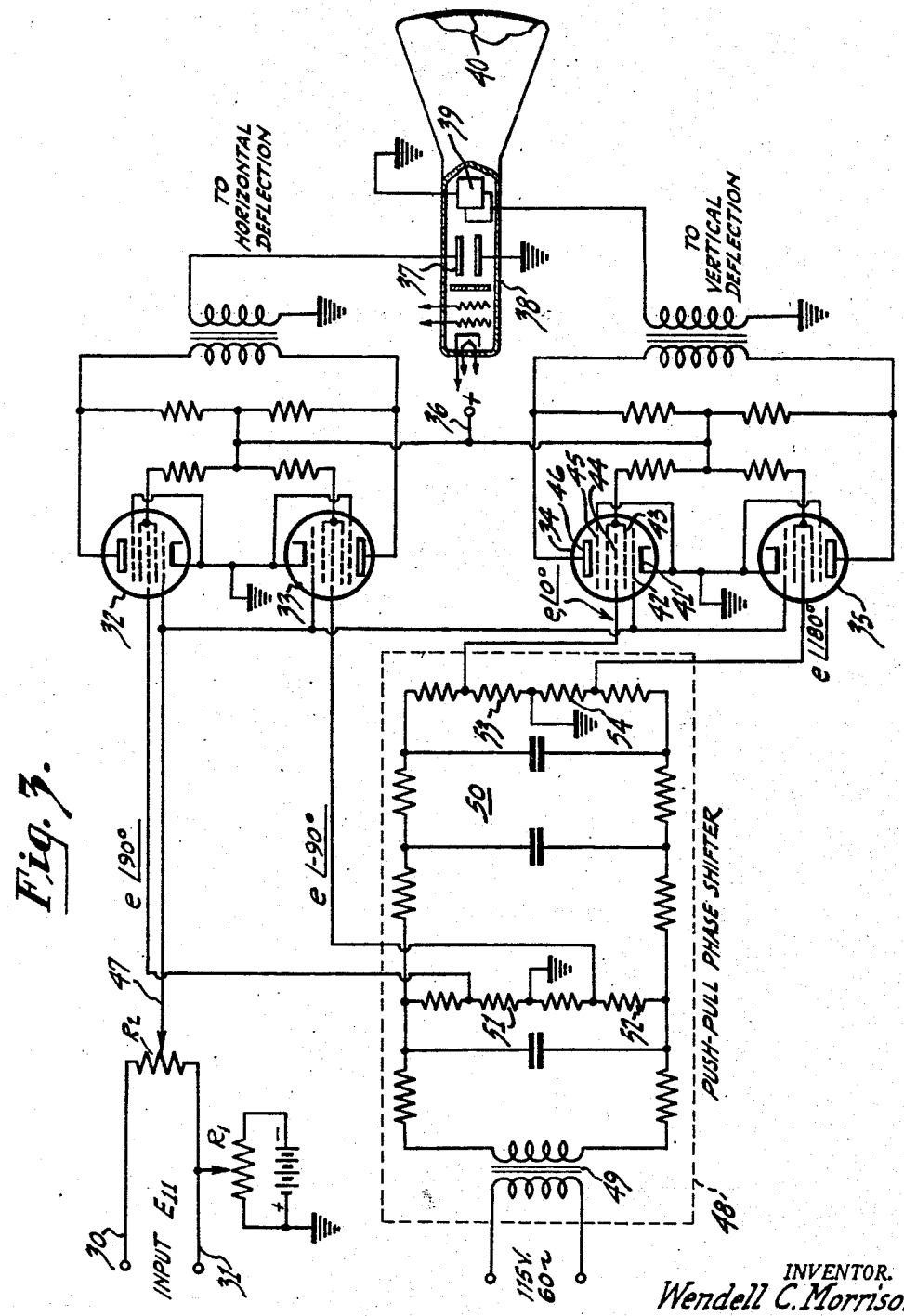

Sept. 25, 1951  W. C. MORRISON  2,568,927
COMPUTING DEVICE
Filed June 5, 1946  4 Sheets-Sheet 1
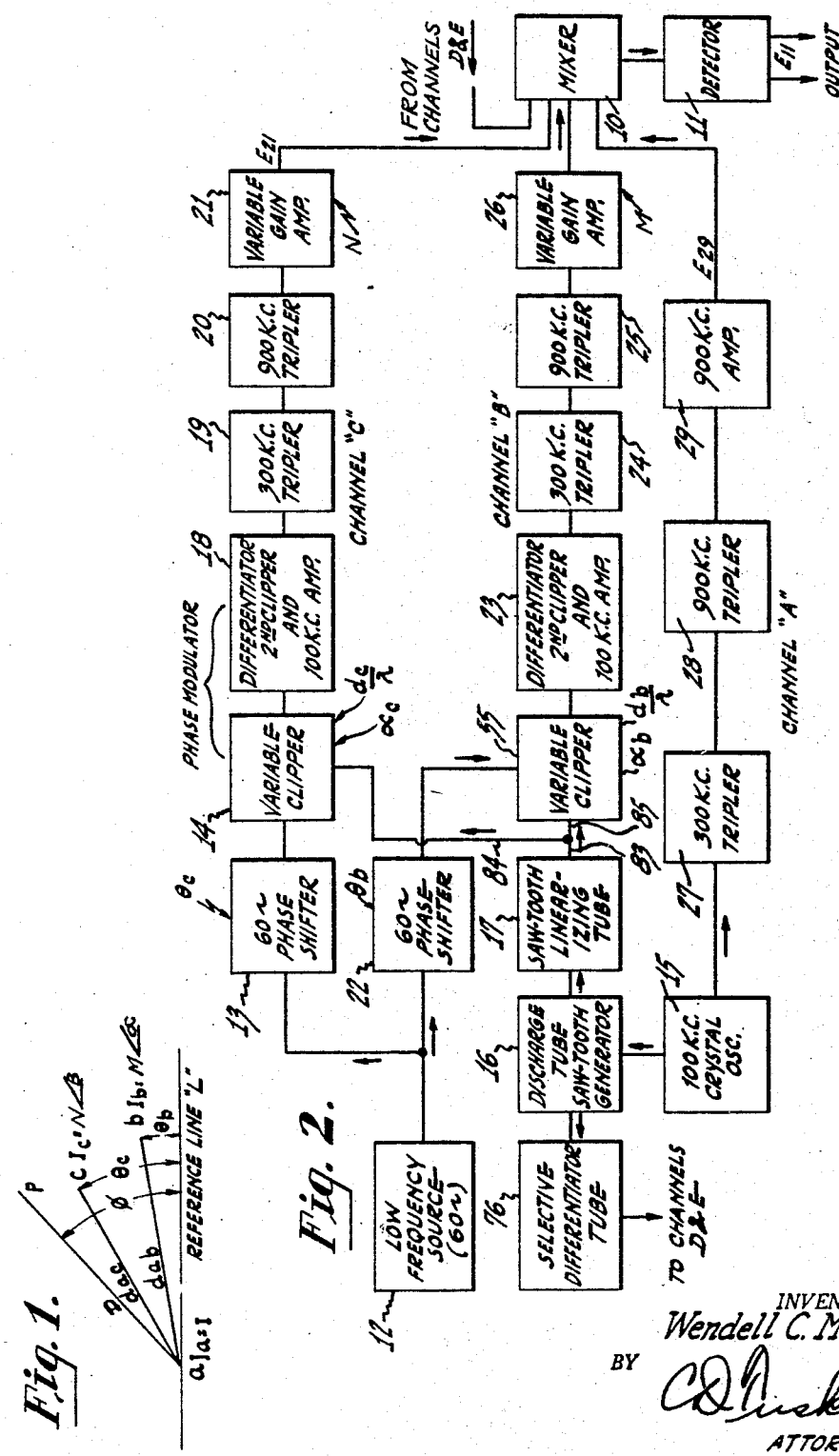
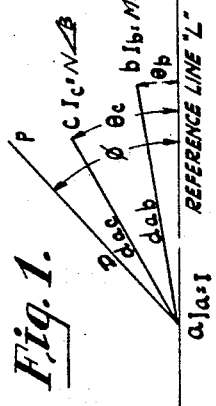
INVENTOR.
Wendell C. Morrison
BY
ATTORNEY Patented Sept. 25, 1951

2,568,927

UNITED STATES PATENT OFFICE 2,568,927

COMPUTING DEVICE

Wendell C. Morrison, Princeton, N. J., assignor to Radio Corporation of America, a corporation of Delaware Application June 5, 1946, Serial No. 674,503

4 Claims. (Cl. 315—24)

This invention relates to computing devices such as are adapted to determine the characteristics of the resultant field pattern produced by an antenna array at a point P which may be considered as moving around the several antennas on the periphery of a circle having a radius very large as compared to the spacing between the antennas. The computing device of the present invention is in the nature of an improvement on the computing device disclosed by George H. Brown in Patent 2,337,968.

As pointed out in the aforesaid patent, there are four variables of each antenna of the array that are involved in the production of the resultant field pattern at the point P. In the case of each antenna, these variables are (1) the current, (2) the phase, (3) the spacing with respect to one of the other antennas which is called a reference antenna and is located on a reference line, and (4) the angular relation between the reference line and a line joining the antenna under consideration with the reference antenna. From these variables of the antennas of the array may be computed the resultant field strength at any point P at any angle $\phi$ from the reference line on which the reference antenna is located.

Such resultant field can be detected to provide a unidirectional potential proportional in value to the strength or intensity of the resultant field. In accordance with the present invention, there is produced a detected voltage which (1) is mathematically equivalent to the field from an antenna array, and (2) is combined with alternating potentials which are in quadrature and are applied respectively to the horizontal and vertical deflectors of a cathode ray oscillograph. As a result, the cathode ray follows a generally circular path having a radius which varies in accordance with the value of the detected voltage so that there is traced on the fluorescent screen of the oscillograph a pattern which is representative of the resultant field produced by the antenna array and may be evaluated in terms of this field.

Important objects of the invention are the provision of an improved field pattern computing device and method of operation for determining the field pattern of the energy radiated from an antenna array, and the provision of an improved means for controlling or guiding the movement of the cathode ray of an oscillograph or the like.

The invention will be better understood from the following description considered in connection with the accompanying drawings and its scope is indicated by the appended claims.

Figure 4:
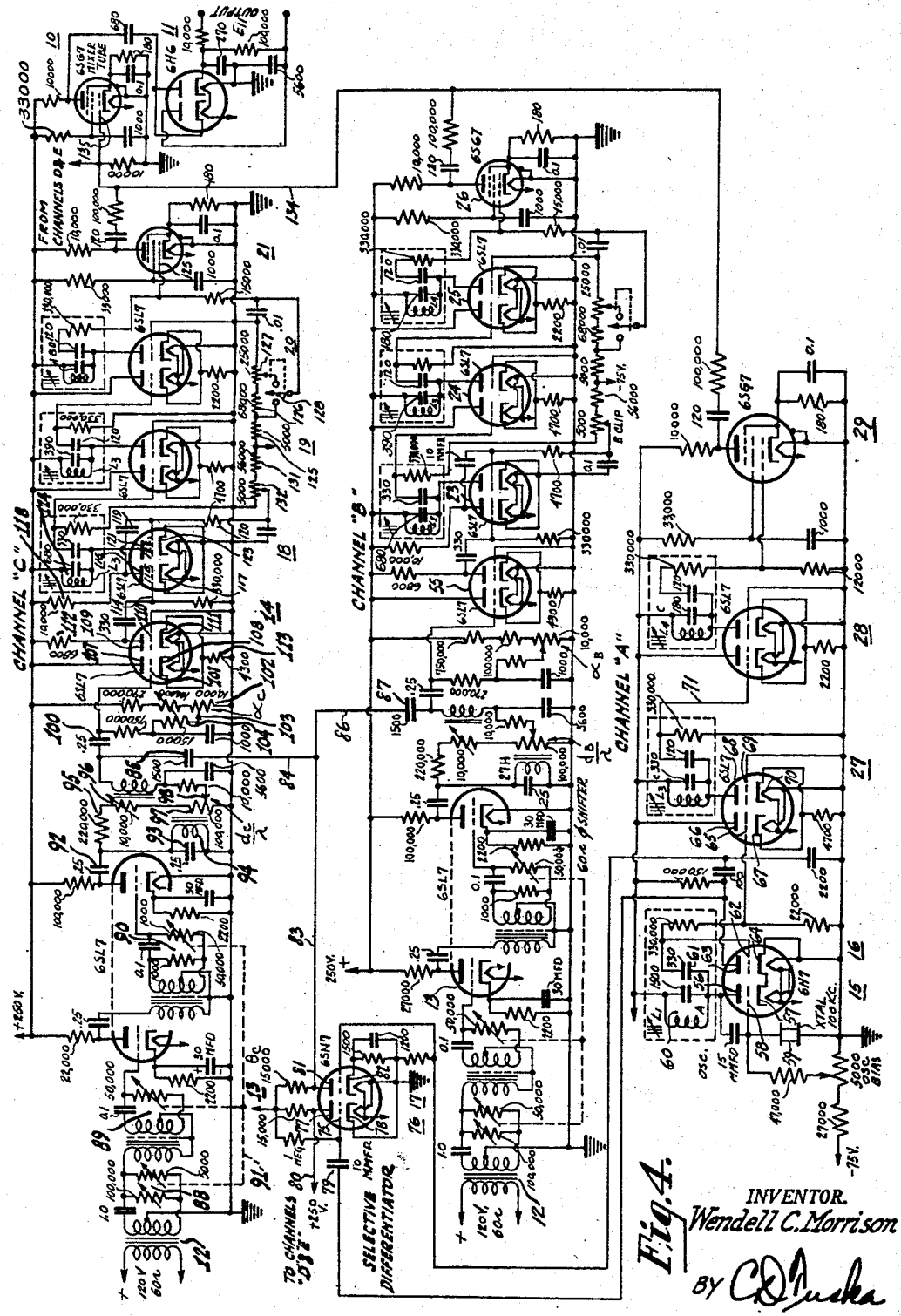
Figure 5:
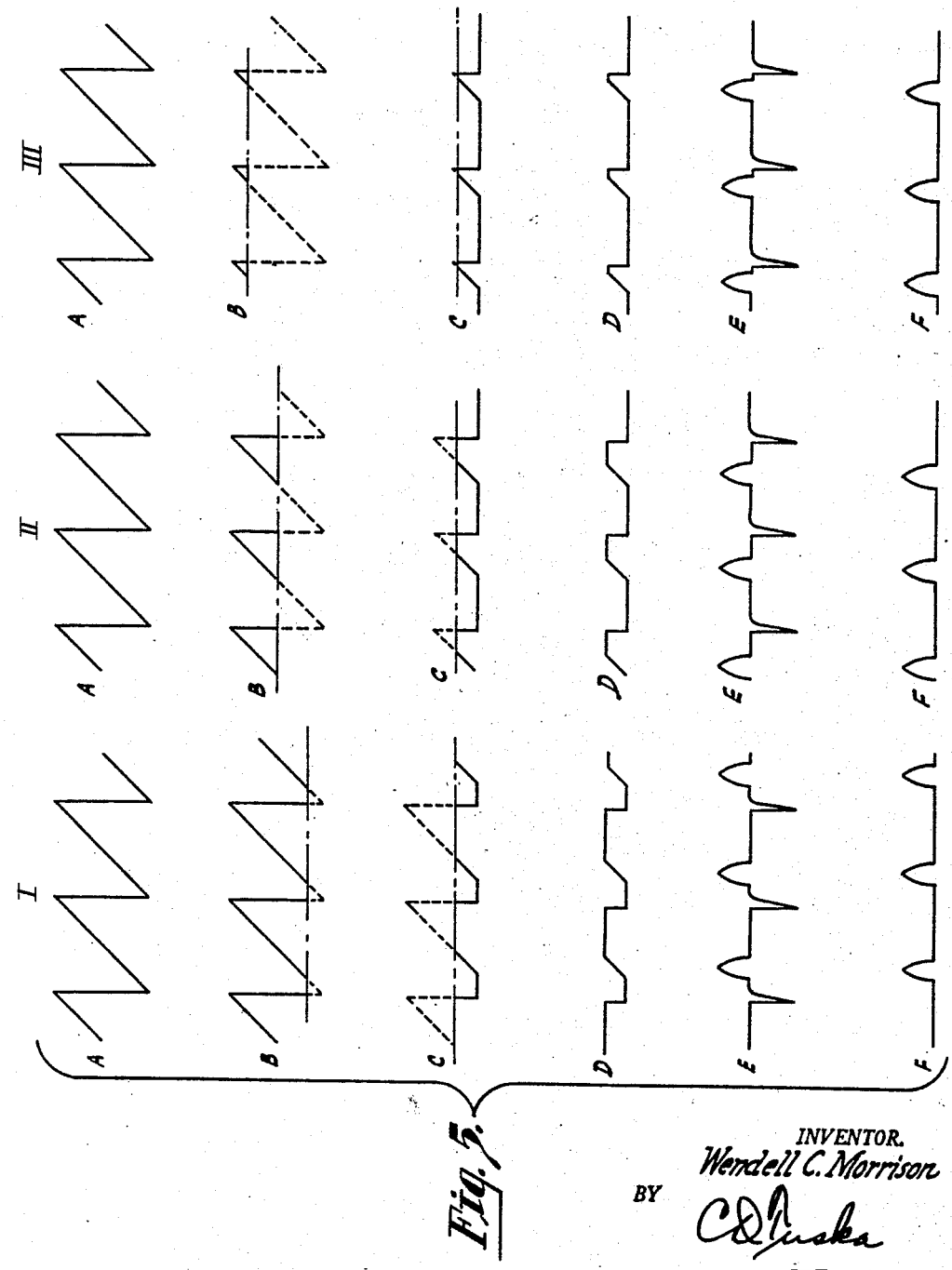

Referring to the drawings:

Figure 1 is an explanatory diagram relating to the operation of the improved computing device of the present invention, Figure 2 is a block diagram of this computing device, Figure 3 is a wiring diagram of the device of Figure 2, Figure 4 is a wiring diagram of the deflecting circuit of the oscilloscope, and Figure 5 illustrates three sets of explanatory curves relating to a phase modulation feature of the invention similar to that disclosed by R. D. Kell in Patents 2,061,734 and 2,280,707.

Figure 1 is like Figure 1 of the aforesaid Patent 2,337,968 (250—33). It shows (1) a first vertical antenna $a$ which is located on a reference line L, a second vertical antenna $b$ which is located at a distance $d_{ab}$ or $$\frac{d_b}{\lambda}$$

from the antenna $a$ and at an angle $\theta_b$ from the reference line L, and (3) a vertical antenna $c$ which is located at a distance $d_{ac}$ or $$\frac{d_c}{\lambda}$$

from the antenna $a$ and at an angle $\theta_c$ from the reference line L. The problem presented for solution is the determination of the resultant field pattern produced by the antennas $a$, $b$, and $c$ at any point P, which is at any angle $\phi$ from the reference line L.

In solving this problem, the current of the antenna $a$ is taken as unity and is designated as $Ia$. The current $Ib$ of the antenna $b$ is equal to a quantity M at a phase angle $a_b$. The current $Ic$ of the antenna $c$ is equal to a quantity N at a phase angle $a_c$. The angle $\phi$ of the point P with respect to the reference line L may vary from 0 to 360 degrees.

A detailed explanation of how these various factors are involved in the production of the intensity of the resultant field at the point P is to be found in the aforesaid patent and in an article entitled "Directional Antennas" by George H. Brown, published in the January 1937 issue of the Proceedings of the Institute of Radio Engineers. In considering the present invention, certain mathematical equations and terms taken from these prior publications will be brought into this disclosure as occasion demands. The various details of the computing device itself will be better understood from Figure 2.

As indicated by Figure 2, this computing device includes a plurality of channels A, B, C, etc., there being one channel for each antenna brought into the consideration of the pattern of the resultant field at the point P. With the exception of the channel A (representing the antenna $a$ which is located on the reference line L and has a current of unity), these channels are alike. The outputs of all the channels are combined in a mixer 10 and the resultant output is detected by a detector 11 to produce a unidirectional potential which (1) has at each instant a value proportional to the intensiy or amplitude of the resultant field at the point P and (2) is combined with the deflecting voltage of the circuit of Figure 3 to control the path of the cathode ray on the fluorescent screen of the oscillograph.

Thus the channel C, for example, includes (1) a low frequency source 12, (2) a phase shifter 13 which has a setting determined by the phase angle $\theta_c$ between the antenna $c$ and the reference line L, (3) a variable level clipper 14 which responds to the low frequency output of the phase shifter 13 and to a 100 kc. saw-tooth frequency derived from an oscillator 15 through a saw-tooth generator 16 and a saw-tooth linearizing tube 17, (4) a differentiator, clipper and 100 kc. amplifier 18, (5) a 300 kc. tripler 19, (6) a 900 kc. tripler 20, and (7) an amplifier 21 which is made to have a gain proportional to the value N of the current of the antenna $c$. The devices 14 and 18 function to provide (1) a fixed phase shift in the carrier proportional to the phase $\alpha_c$ of the current N in the antenna $c$ and (2) a phase modulation of the carrier proportional to the distance $$\frac{d_c}{\lambda}$$

of the antenna $c$ from the antenna $a$.

As explained in the publications previously mentioned, the field at the point P due to antenna $a$ is equal to $Ia \sin \omega t$, the field produced at the point P due to antenna $c$ is equal to $$McIa \sin \omega t = Ic \sin \omega t$$

and the field produced at the point P due to both antenna $a$ and antenna $c$ is equal to $$Ia \sin \omega t + Ic \sin \left[ \omega t + \alpha_c + \frac{2\pi d_c}{\lambda} \cos (\omega ct - \theta c) \right]$$

The output voltage of the amplifier 21 is made proportional to $Ic \sin \omega t$.

The channel B likewise (1) is connected to the low frequency source 12 through a phase shifter 22, (2) is connected to the oscillator 15 through the saw-tooth generator 16 and the saw-tooth linearizing tube 17, and (3) includes a differentiator-clipper-amplifier 23, a 300 kc. tripler 24, a 900 kc. tripler 25 and a variable gain amplifier 26 which has its output connected to the mixer 10. The output voltage of the amplifier 26 is proportional to $MbIa \sin \omega t = Ib \sin \omega t$.

The channel A includes the oscillator 15, a 300 kc. tripler 27, a 900 kc. tripler 28 and a 900 kc. amplifier 29 which has its output connected to the mixer 10. The voltage $E_{29}$ appearing at the output of the amplifier 29 is equal to $1.0 \sin \omega t$ and is proportional to the intensity of the field produced at the point P by the antenna $a$.

As previously indicated, the field produced at the point $p$ by two antennas $a$ and $b$ is equal to $$k \left\{ I_a \sin \omega t + I_b \sin \left[ \omega t + \alpha_b + \frac{2\pi d_b}{\lambda} \cos (\varphi - \theta_b) \right] \right\}$$

The operation of the computing device of the present invention to produce a representation of this field involves the following steps:

(1) Take from an oscillator of frequency $f_1$ two voltages $$e_1 = kI_a \sin \omega_1 t$$
$$e_2 = kI_b \sin \omega_1 t$$

(2) Take from an oscillator of frequency $f_0$ a voltage $e_0$ which can be shifted in phase through angle $\theta_b$ $$e_0 = \frac{2\pi d_b}{\lambda} \cos (\omega_0 t - \theta_b)$$

(3) Use $e_0$ to phase modulate $e_2$ giving $$e_2' = kI_b \sin \left[ \omega_1 t + \frac{2\pi d_b}{\lambda} \cos (\omega_0 t - \theta_b) \right]$$

(4) Phase shift $e_2$ an amount $\alpha_b$ giving $$e_2' = kI_b \sin \left[ \omega_1 t + \alpha_b + \frac{2\pi d_b}{\lambda} \cos (\omega_0 t - \theta_b) \right]$$

(5) Add $e_1$ and $e_2'$ giving $$e = K \left\{ I_a \sin \omega_1 t + I_b \sin \left[ \omega_1 t + \alpha_b + \frac{2\pi d_b}{\lambda} \cos (\omega_0 t - \theta_b) \right] \right\}$$

The sum $E_{21} + E_{26} + E_{29}$ is a resultant voltage which is proportional to the resultant field intensity produced at the point P by the antenna $a$, $b$ and $c$. If the fields of additional antennas, such as $d$, $e$, etc. require consideration, additional channels similar to the channels B and C are connected into the circuit of the device as indicated by the legends of Figure 2.

In any case, the resultant voltage ($E_{21} + E_{26} + E_{29}$ etc.) is derived in the mixer 10 and detected by the detector 11 which provides a unidirectional potential $E_{11}$ having a value proportional to the intensity of the resultant field produced at the point P by the various antennas taken into consideration.

This unidirectional voltage $E_{11}$ is applied to the leads 30 and 31 of the cathode ray deflecting circuit of Figure 3.

The deflecting circuit of Figure 3 includes a pair of identical push-pull amplifiers 32—33 and 34—35 which have potentials applied to their anodes and screen grids from $a+B$ terminal and have their cathodes grounded. Amplifiers 34—35 are connected to apply to the vertical deflectors 37 of a cathode ray oscillograph 38 an alternating potential which is in quadrature with that applied to the horizontal deflectors 39 of this oscillograph by the amplifiers 32—33. The oscillograph 38 has a fluorescent screen 40 at its enlarged end and is otherwise of a conventional type well known to those skilled in the art. It is well known that the application of quadrature potentials to the vertical and horizontal deflectors of such an oscillograph causes the cathode ray to trace a circular path on the screen 40. As hereinafter explained, this path is made to have a very short radius in the absence of the potential $E_{11}$ and is made to increase in radius as the value of $E_{11}$ increases so that there is produced on the screen 40 a pattern which is representative of the field intensity at the point P and is repeated once for every cycle of the deflecting potential.

It will be noted that the tubes 32, 33, 34 and 35 are of the pentagrid converter or heptode type which includes a cathode 41, a first control grid 42, a screen or shield grid 43, a second control grid 44 which is shielded from the other electrodes of the heptode by the screen grid 43, and a suppressor grid 45 which functions to drive secondary electrons back to an anode 46. The voltage E₁₁ is applied to the second control grids of all the heptodes 32 to 35 in parallel through a circuit which includes a bias control resistor R₁, a resistor R₂, a lead 47 and the ground connections.

Low frequency alternating potential is applied to the second control grids of the heptodes 32 to 35 from a push-pull phase shifter 48 which includes a transformer 49 and a delay network 50. Thus the push-pull potentials of the second control grids of the devices 32 and 33 are derived from one end of the network 50 through the resistors 51 and 52, and the push-pull potentials of the second control grids are derived from the other end of the network 50 through the resistors 53 and 54. The characteristics of the network 50 are made such that alternating potentials applied to the second control grids of the heptodes 32 and 33 are in quadrature with those applied to the second control grids of the heptodes 34 and 35 as indicated by the legends applied to the leads of the different second control grids.

Since the low frequency potential is applied in push-pull, the unidirectional voltage E₁₁ is applied in parallel, and the output of the amplifiers 32—33 and 34—35 is taken off in push-pull, none of the input signal E₁₁ will appear in the output. This might suggest a similarity to the balanced modulators used in suppressed carrier transmission work. There are distinctions, however, which should be recognized. In the circuit of Figure 3, (1) the signal that would be the carrier in a balanced modulator is a unidirectional potential of variable amplitude, (2) the amplifiers are operated near cut-off grid bias potential, and (3) the push-pull signal that would be a varying voice signal in a balanced modulator is fixed. As a result, the output of the amplifiers 32—33 and 34—35 does not consist of the side bands of the low frequency with the voltage E₁₁ suppressed but does consist of a low frequency potential with an amplitude which varies in accordance with the value of the voltage E₁₁.

Figure 4 shows the connections of the various elements represented in Figure 2 as boxes, the same reference numerals being applied to corresponding parts of the two figures. Most of these parts are of conventional design and readily understood without detailed explanation. As an aid in practicing the invention, suitable values for one modification are placed adjacent the various parts in units which are recognized by those skilled in the art, and in cases of possible ambiguity the units have been indicated. They are not to be taken as critical for the reason that different sets of values will be applicable to different uses of the invention.

The 100 kc. oscillator 15 includes the anode 56, the cathode 57, the grid 58, the crystal 59 and the LC circuit 60 which is tuned to 100 kc. The output of this oscillator is coupled through a capacitor 61 to the grid 62 of the saw-tooth discharge triode 63—62—64 and to the grid 65 of a triode 66—65—67.

The triode 66—65—67 functions, together with a triode 68—69—70 and the output network of the triode 68—69—70, to produce at an output lead 71 a sinusoidal potential of 300 kc. The tripler 27 formed by the triodes 66—65—67 and 68—69—70 and the output circuit of the latter triode is fundamentally a symmetrical clipper with a tuned circuit in its output. The square wave which it produces is very rich in odd harmonics so that the output is readily tuned to select the desired harmonic.

This harmonic is delivered through the lead 71 to the tripler 28 which is similar to the tripler 27, and the 900 kc. output is amplified by the amplifier 29 and applied to the mixer tube 10 as previously explained in connection with Figure 2.

The output of the saw-tooth discharge triode is connected through a lead 72 to the grid of saw-tooth linearizing tube 17 and through a lead 74 to the grid 75 of a selective differentiator 76.

The selective differentiator 76 includes the triode 77, 75, 78 which responds only to negative changes in the potential applied to the grid 75 through the lead 74 and a capacitor 79, and delivers at its output lead 80 a pulse for producing a synchronized saw-tooth wave for the channels D and E which are similar to the channels B and C and delivers their outputs to the mixer 10 as previously indicated.

The saw-tooth linearizing triode 81—73—82 functions to make the saw-tooth wave more linear because of the compensating curvature of its characteristic, and delivers its output (1) through leads 83 and 84 and a capacitor 85 to a coupling network interposed between the phase shifter 13 and the variable level clipper 14 of the channel C, and (2) through the lead 83, a lead 86 and a capacitor 87 to a similar network interposed between the phase shifter 22 and the variable level clipper 55 of the channel B.

The phase shifter 13 of channel C includes three conventional constant amplitude RC phase shifters 88, 89 and 90 which are connected in cascade and have their control elements ganged together as indicated by the dotted line 91 so as to provide a phase shift of 360 degrees. The control element 91 is adjusted to produce a phase shift proportional to the angle $\theta_c$ between the reference line L and the antenna $c$ as previously explained. The output of the phase shifter 13 is delivered through a capacitor 92 to a low frequency resonant circuit 93—94 in shunt with which there are connected a resistor 95, a trimmer resistor 96 and a resistor 97 which is provided with a sliding contact 98 for adjusting the low frequency output to an amplitude proportional to the spacing $$\frac{2\pi d_e}{\lambda}$$

between the antenna $c$ and the reference line L.

The saw-tooth carrier is applied to the variable level clipper 14 through lead 84 and capacitors 85 and 100. The gate of this clipper 14 has its level or position controlled by two voltages. The first of these voltages is a unidirectional one which (1) is derived from a resistor 102 through a movable contact 103 and resistors 104 and 105 and (2) is made proportional to the phase angle $\alpha_c$ of the current N of the antenna $c$. The second of these voltages is a sinusoidal or alternating voltage which (1) is derived from the resistor 97 and (2) moves the gate of the clipper up and down continuously at the low frequency rate of the source 12.

The variable level clipper 14 functions to clip the positive and negative peaks of the saw-tooth carrier and to deliver to the clipper-amplifier-differentiator stage 18 a carrier wave of trapezoidal form. The form of the original carrier is illustrated in Figure 5 at I-A, II-A and III-A. At I-B, II-B and III-B is shown the clipping effect at one side of the gate for different values of the unidirectional potential applied to it. At I-C, II-C and III-C is shown the clipping effect at the other side of the gate. The result of these two clipping effects is the trapezoidal wave shown at I-D, II-D and III-D. It will be noted that the length of the trapezoidal wave is different in each of these three cases.

The variable level clipper 14 includes a triode 107—101—108, a triode 109—110—111 which has a resistor 112 in its anode lead and a resistor 113 common to the cathodes 108 and 111. This clipper delivers to the triode 116—115—117 a wave of the type shown in Figure 5 at I-D, II-D and III-D.

The triode 116—115—117 functions to amplify this trapezoidal wave and to square off its positive half cycles due to its operation without fixed biased potential.

From the triode 116—115—117, the trapezoidal wave is applied to the differentiator 119—120 which produces at the grid 122 of the triode 121—122—123 a wave of the type shown in Figgure 5 at I-E, II-E and III-E. The grid 122 is biased through a resistor 132 to a potential such that this differentiated wave is clipped to the form shown in Figure 5 at I-F, II-F and III-F. This differentiated and clipped wave is utilized to shock excite a circuit 124 which is tuned to a frequency of 110 kc. The resulting 100 kc. output is applied to the tripler 19 which delivers its output to the tripler 20 as indicated in connetcion with the triplers 27 and 29 of channel A.

The 900 kc. output of the tripler 20 is applied to the control grid 125 of the variable gain amplifier 21. Also applied to this grid is a bias voltage which is varied so as to make the output voltage of the amplifier 21 proportional to the current N of the antenna C.

This bias voltage is derived from a —75 v. lead through resistors 125, 126 and 127, a sliding contact 128 and a switch 129. The relation between the switch 129 and the contact 128 is such that, when the contact 128 approaches the end of its travel in the counter-clockwise direction, the switch 129 snaps to its left hand closed position thus making the grid 125 almost 75 volts negative, reducing the gain of the amplifier to zero, and eliminating the channel c as a factor in the final result.

The output voltage $E_{21}$ of the amplifier 21 thus has an amplitude and phase determined by (1) a component dependent on the adjustment of the low frequency phase control member 91, (2) a component dependent on the adjustment of the gate by means of the slider 98, (3) a component dependent on the adjustment of the gate by means of the slider 103, and (4) a component dependent on the adjustment of the slider 127 by which the bias potential of the grid 125 is determined.

This voltage $E_{21}$, together with similar voltages derived from the channels A, B, D, etc. is applied to the control grid 135 of the mixer tube 10.

Thus the invention is characterized by (1) a plurality of similar channels in each of which is originated such factors as are required to meet the mathematical requirements for determining the intensity of the field produced at a given point by a different antenna, (2) by means for deriving a resultant potential having a value which varies in proportion to the resultant field produced at the given point by all the different antennas and (3) by an improved cathode ray oscillograph deflecting circuit whereby deflecting voltages in quadrature are made to vary in amplitude in accordance with a single unidirectional potential.

The instantaneous amplitude of the output of 10 is proportional to the instantaneous field at point P with one cycle of the low frequency modulating voltage corresponding to one revolution of the point P around the array.

The envelope of this voltage—obtained from the detector 11—is a unidirectional voltage which varies proportional to the field intensity at point P. Again one cycle of the low frequency modulating voltage corresponds to a 360 degree rotation of point P around the array.

The output from the detector can be used directly to give a rectangular coordinate plot. The horizontal saw-tooth sweep on the oscilloscope is operated at a rate synchronous with the low frequency modulating voltage and the output of the detector is applied to the vertical deflection plates of the oscilloscope. Then one horizontal sweep corresponds to the 360° around the antennas and the vertical deflection is proportional to the field intensity at each particular angle.

I claim as my invention:

1. The combination of a cathode ray device having vertical and horizontal deflectors, means for applying to said deflectors potentials which are in quadrature, means for varying said potentials by a single unidirectional potential whereby the radius of the path followed by the ray of said device is determined, means for producing an effect proportional to the intensity of the field produced at a given point by a radiation source spaced from said point, and means responsive to said effect for varying the value of said unidirectional potential.

2. The combination of a cathode ray device having vertical and horizontal deflectors, means for applying to said deflectors potentials which are in quadrature, means for varying said potentials by a single unidirectional potential whereby the radius of the path followed by the ray of said device is determined, means for producing an effect proportional to the intensity of the resultant field produced at a given point by different radiating sources spaced from said point and from one another, and means responsive to said effect for varying the value of said unidirectional potential.

3. The combination of a cathode ray device having vertical and horizontal deflectors, a pair of push-pull amplifiers each having an output circuit connected to a different one of said deflectors and each including a pair of electron discharge devices each having a pair of control grids, means for applying a first unidirectional potential to one grid of each of said devices in parallel, means for applying to the other grids of said devices push-pull potentials which are out of phase with one another, a clipper including an input circuit and an output circuit, means for applying a second unidirectional potential to said input circuit, means for applying to said input circuit a carrier wave which is limited in accordance with a low frequency potential of a predetermined phase, means for differentiating the output wave of said clipper, means for clipping said differentiated wave, a tuned circuit arranged to be shock excited by said differentiated and clipped wave, means including a third amplifier having an input circuit responsive to the output of said tuned circuit, means for applying to said third amplifier input circuit a potential having components corresponding to the azimuth, the spacing and the phase of the current of a given radiator with respect to a reference condition and additional means for varying the amplitude of the output potential of said third amplifier, and means including a detector for controlling said first unidirectional potential in accordance with the output of said third amplifier.

4. The combination of a cathode ray device having vertical and horizontal deflectors, a pair of push-pull amplifiers, each having an output circuit connected to a different one of said deflectors and each including a pair of electron discharge devices each having a pair of control grids, means for applying a unidirectional potential to one grid of each of said devices in parallel, means for applying to the other grids of said devices push-pull potentials which are out of phase with one another, means for producing an effect proportional to the intensity of the resultant field produced at a given point by different radiating sources spaced from said point and from one another, and means responsive to said effect for varying the value of said unidirectional potential.

WENDELL C. MORRISON.

REFERENCES CITED

The following references are of record in the file of this patent:

UNITED STATES PATENTS

| Number | Name | Date |
|---|---|---|
| 2,153,638 | Norman | Apr. 11, 1939 |
| 2,213,172 | Sherman | Aug. 27, 1940 |
| 2,233,275 | Wolff | Feb. 25, 1941 |
| 2,248,852 | Cannon | July 8, 1941 |
| 2,265,848 | Lewis | Dec. 9, 1941 |
| 2,273,511 | Bruck | Feb. 17, 1942 |
| 2,312,761 | Hershberger | Mar. 2, 1943 |
| 2,337,968 | Brown | Dec. 23, 1943 |
| 2,391,862 | Boyle | Jan. 1, 1946 |
| 2,419,550 | Hardy | Apr. 29, 1947 |
| 2,421,312 | Bobb | May 27, 1947 |
| 2,425,999 | Crosby | Aug. 19, 1947 |
| 2,432,944 | Shillington | Dec. 16, 1947 |
| 2,442,770 | Kenyon | June 8, 1948 |
| 2,457,580 | Mayer | Dec. 28, 1948 |